United States Patent [19]

Joss

[11] Patent Number: 5,043,581
[45] Date of Patent: Aug. 27, 1991

[54] METHOD FOR MEASURING THE RADIOACTIVITY OF SAMPLES AND AN APPARATUS FOR CARRYING OUT THE METHOD

[75] Inventor: Urs Joss, Basel, Switzerland

[73] Assignee: Ciba-Geigy Corporation, Ardsley, N.Y.

[21] Appl. No.: 519,708

[22] Filed: May 7, 1990

[30] Foreign Application Priority Data

May 11, 1989 [CH] Switzerland .......................... 1781/89

[51] Int. Cl.⁵ .............................................. G01T 7/02
[52] U.S. Cl. ..................................... 250/328; 422/102
[58] Field of Search .................. 422/102; 250/328, 303

[56] References Cited

U.S. PATENT DOCUMENTS

| | | | |
|---|---|---|---|
| 3,924,128 | 12/1975 | Frank | 250/328 |
| 4,065,383 | 12/1977 | Skare et al. | 250/303 |
| 4,119,850 | 10/1978 | Reddy et al. | 250/328 |
| 4,292,273 | 9/1981 | Butz et al. | 422/102 |
| 4,752,557 | 6/1988 | Tsuchino et al. | 250/483.1 |

FOREIGN PATENT DOCUMENTS 2167279 5/1986 United Kingdom .

Primary Examiner—Carolyn E. Fields
Attorney, Agent, or Firm—Harry Falber

[57] ABSTRACT

The invention relates to a method and an apparatus for measuring the radioactivity of samples that are arranged in the wells of a microtitre plate and in which the radio-activity is solid-bound, for example cell-bound, or is in the form of a protein precipitate, wherein samples suspended, dissolved or mixed in liquids are first separated from the liquids and then their liquid supernatant is removed by suction. The invention comprises connecting the bases (4) of the wells of the microtitre plate to one another and then separating them from the microtitre plate or the well walls in such a manner that they remain connected, and subsequently measuring the samples they carry in succession, in groups or simultaneously over the entire grid. Thus, the well bases (4) can be handled and prepared for the measurement of radioactivity in their original position and arrangement even after separation from the rest of the microtitre plate, it being possible to bring the bases (4), which have been separated from the microtitre plate, and the samples arranged thereon close to, and within touching distance of, the measuring apparatus. As a result, a high degree of sensitivity and spatial resolution can be achieved, even in the case of samples of which the emitted electron radiation has only a very small range.

12 Claims, 4 Drawing Sheets

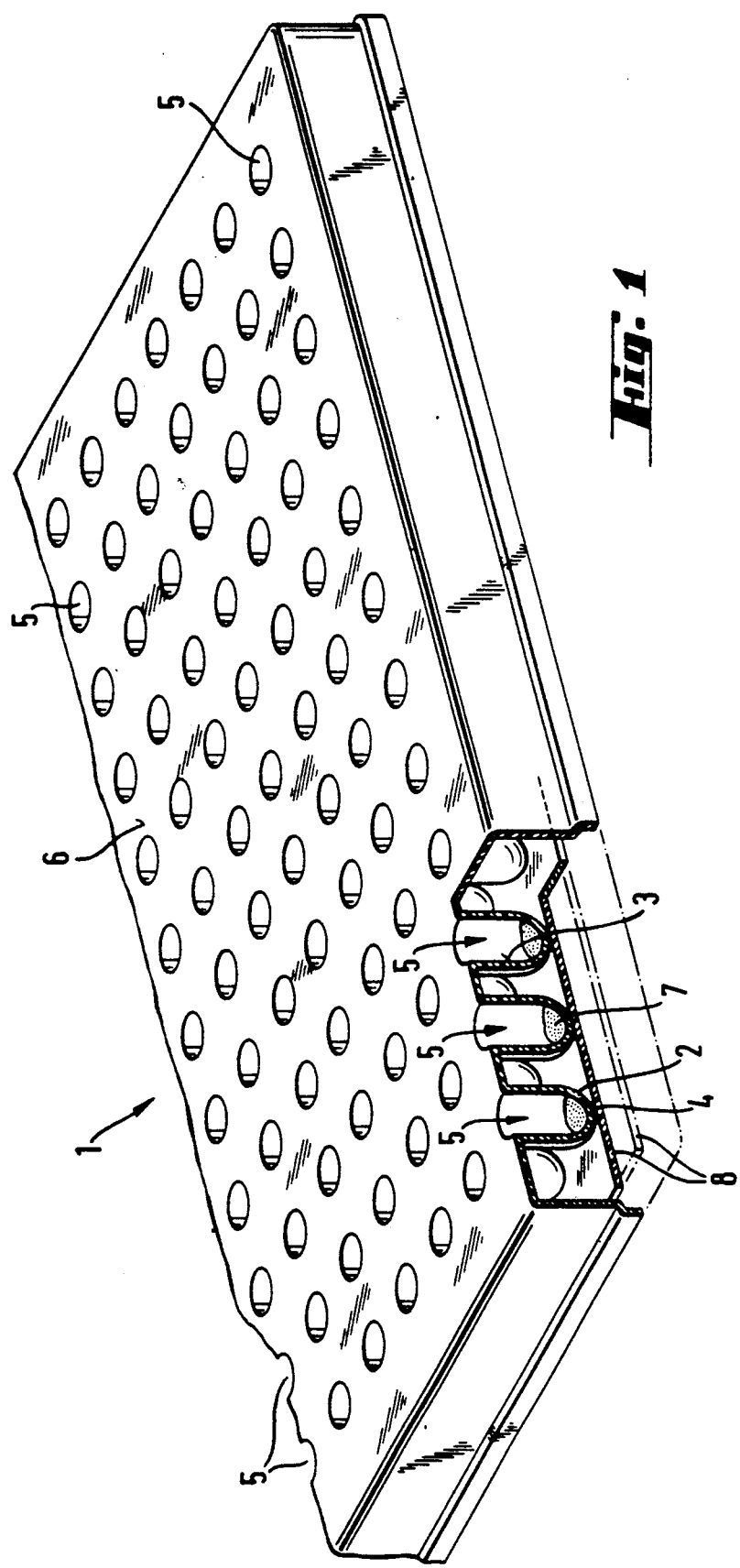

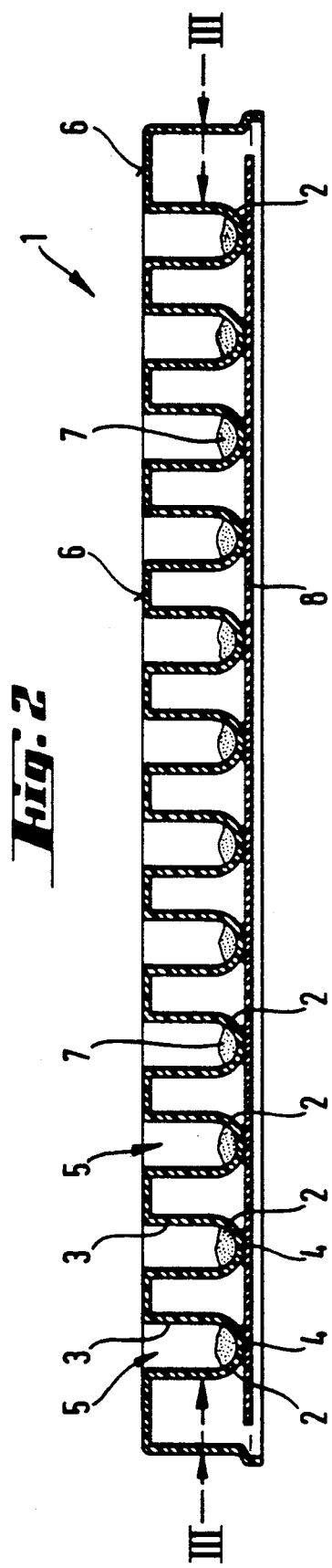
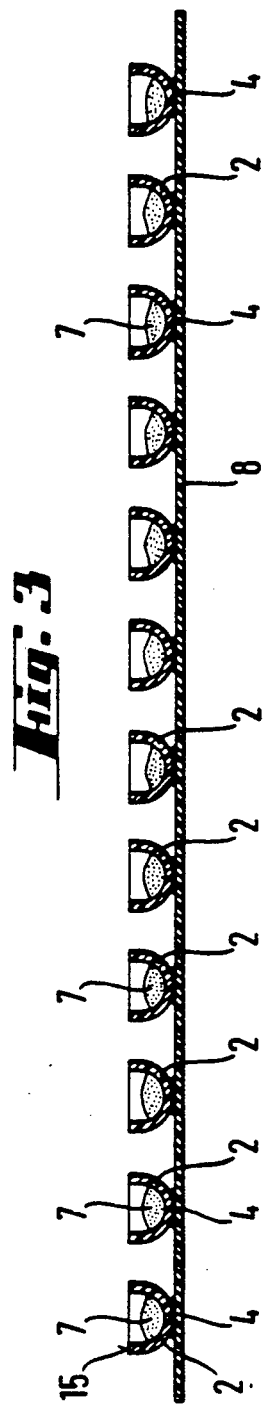

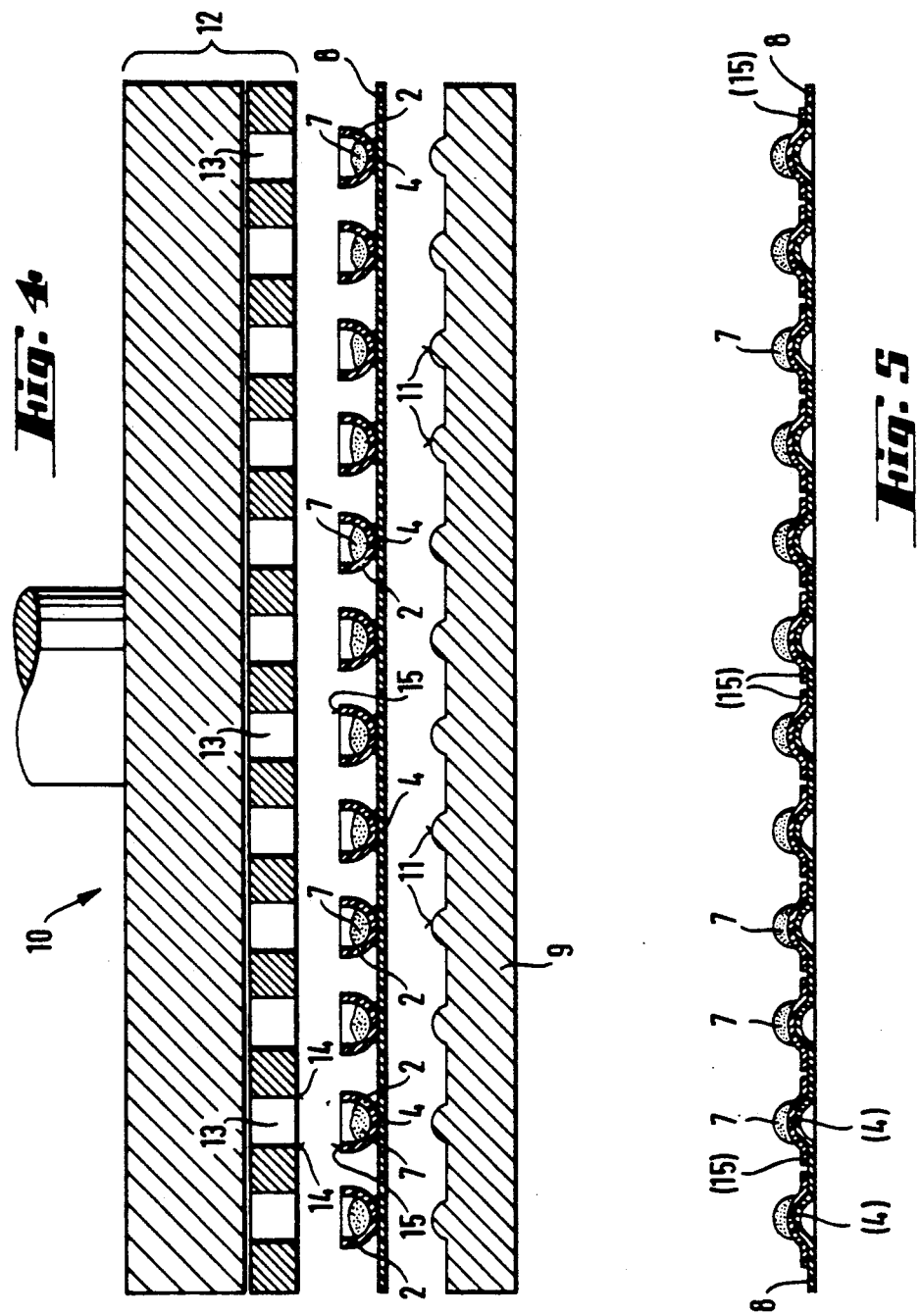

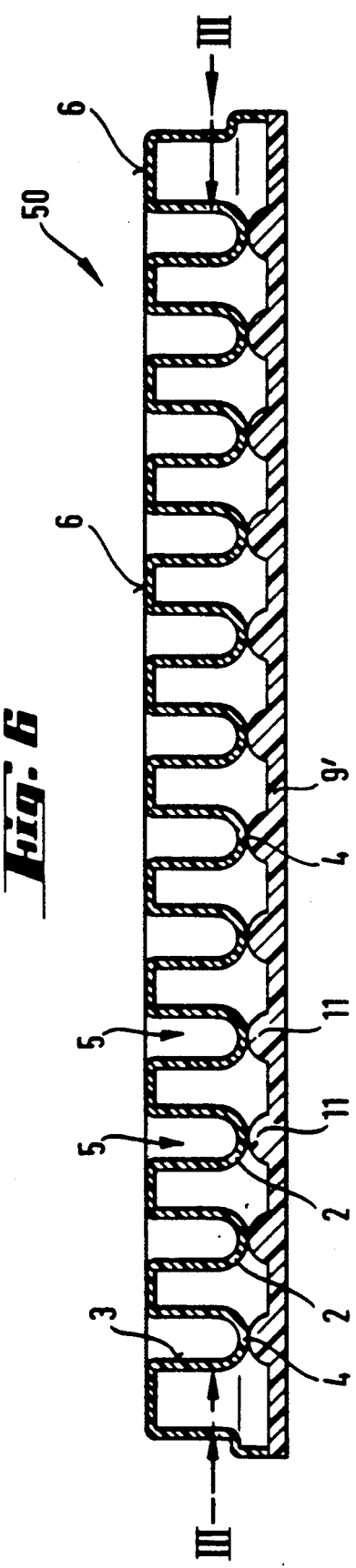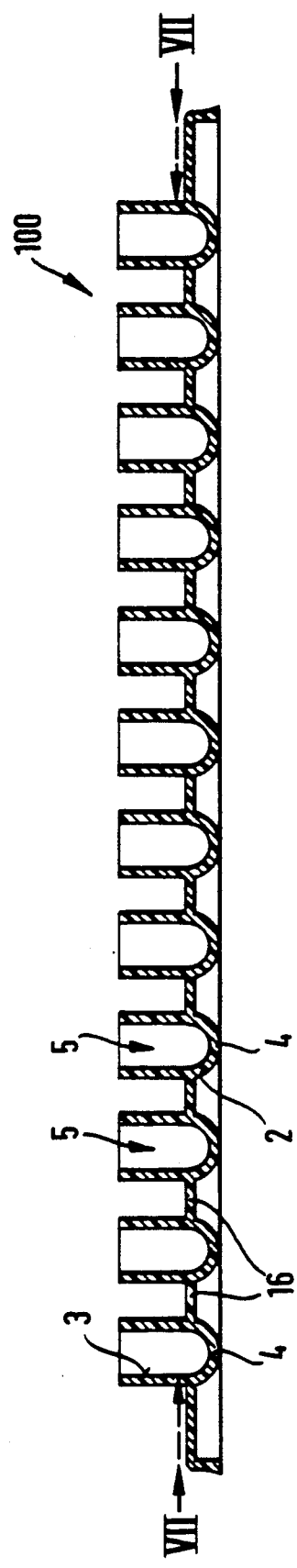

METHOD FOR MEASURING THE RADIOACTIVITY OF SAMPLES AND AN APPARATUS FOR CARRYING OUT THE METHOD

The invention relates to a method for measuring the radio-activity of samples that are arranged in the wells of a microtitre plate and in which the radioactivity is solid-bound, for example cell-bound, or is in the form of a protein precipitate, wherein samples suspended, dissolved or mixed in liquids are first separated from the liquids and then their liquid supernatant is removed by suction. The invention relates also to an apparatus, especially for carrying out the method mentioned at the beginning.

For some years, increasing use has been made of so-called microtitre plates for a wide variety of medical-biochemical test methods, such as, for example, the radioimmuno-assay, the radio-receptor assay and also receptor screening for the identification of new active substances. Such microtitre plates usually comprise a large number of wells which are arranged in rows and columns with respect to one another and which are connected to one another in the region of their openings.

Test methods of that kind are often used to measure solid-bound radioactivity which is, for example, cell-bound or in the form of a protein precipitate. For that purpose, samples suspended, dissolved or mixed in liquids are first of all, for example, centrifuged or separated from the liquids by magnetic separating methods, and their liquid supernatant is removed by suction in order subsequently to separate each individual sample-containing well of the respective microtitre plate using a hot wire or a special cutting device.

Such a test method, however, involves considerable expense since each of these detached, individual microtitre plate wells is treated and measured separately.

A test method has therefore already been provided in which the solids suspension in the wells of a microtitre plate is suctioned off through a filter and then the radioactivity of the solids bound to the filter is measured. This test method has been largely automated but has its limitations. For example, the non-solid-bound radioactivity is often also retained by the filter, which results in a high background level and correspondingly inaccurate results.

In addition, with relatively small volumes of less than 100 microlitres there is a risk that radioactivity will be retained in the suction system to an extent exceeding the permissible tolerances. Small volumes of, for example, a maximum of 40 microlitres have the particular advantage, however, that the use of radioactivity can be decreased and the associated problems of disposal can be reduced.

In FR-A-2,308,101 (U.S. Pat. No. 4,065,383) it is proposed that a liquid containing radioactivity be absorbed from the well using a small absorbent rod. The rod is then introduced into a scintillation counter and its activity measured. This method is relatively complicated and could easily cause contamination: for example, radioactive matter may drip from the rod and contaminate the workplace in an uncontrolled manner.

GB-A-2,167,279 describes an X-ray detector field arranged in the form of a grid, as is used, for example, in the testing of weld seams. It is not sufficiently sensitive, however, for the measurement of radioactivity bound in microtitre plates.

Finally, EP-A-126,564 (U.S. Pat. No. 4,752,557) describes a storage element for radiation. It has a plurality of cells arranged in the form of a grid which are filled with a layer of a luminous substance capable of phosphorescing. This apparatus is not, however, suitable for the quantitative determination of the activity of samples contained in the individual wells of microtitre plates.

Quantitative in situ measurement of the radioactivity of samples in microtitre plate wells has, however, hardly been possible hitherto since the electron radiation emitted has only a very small range and the measuring apparatus, for example a location-dependent Berthold proportional counter tube, cannot be placed sufficiently close to the samples owing to the depth of the wells.

The problem is therefore to provide a comparatively inexpensive method for measuring the radioactivity of samples arranged in the wells of a microtitre plate, with which method it is also possible to measure samples of small volume with the smallest possible degree of measuring inaccuracy.

The problem is also to provide a simple apparatus, especially for carrying out the method according to the invention.

In the case of the method of the type mentioned at the beginning, the solution consists especially in connecting the bases of the wells of the microtitre plate to one another and then separating them from the microtitre plate or the well walls in such a manner that they remain connected, and subsequently measuring the samples they carry in succession, in groups or simultaneously over the entire grid. Since the bases of the wells are first connected to one another before being separated from the microtitre plate, their original spacing and arrangement relative to one another is maintained. The interconnected well bases can be handled in their original interconnected arrangement even after separation from the rest of the microtitre plate, which is beneficial to the low cost of the method according to the invention. The samples carried by the well bases do not have to be measured individually, but, rather, can also be readily measured in groups or simultaneously over the entire grid. The measuring apparatus can now, however, be placed considerably closer to the individual samples so that more accurate values are obtained and, despite the proximity of the measuring positions to one another, no mutual interference results. An especially advantageous development of the method according to the invention, which can be accorded its own importance worthy of protection, provides that the interconnected well bases of the microtitre plate are so deformed, after they have been detached, that wall portions, or suchlike regions, which are arranged thereon and are directed upwards by reason of the curvature or lateral limitation of the well bases can be turned inside out and/or pressed down. As a result of the deformation of the wall portions of the wells, which portions project beyond the bases, the sample arranged on the well base can be brought to within touching distance of the measuring apparatus, which results in an even greater sensitivity and spatial resolution even when the volume of the individual sample is small.

According to a further proposal according to the invention, the upwardly directed wall portions or suchlike regions of the well bases are heated until deformation occurs, and, if necessary, they are pressed down.

By heating the upwardly directed wall portions or the like, they can be readily deformed and pressed down, possibly even in cases where the material of the microtitre plate is relatively thick, so that the individual samples are accessible to the measuring device, for example at a very small distance.

In the case of the apparatus of the type mentioned at the beginning, the solution according to the invention consists especially in that the apparatus has a support for the well bases which is provided with upwardly directed nubs arranged with the same grid spacing as the wells of a microtitre plate and their well bases, and a press stamp is provided which has, in the region of the nubs of the support, indentations, recesses, perforations or suchlike depressions and, alongside them, annular areas or pressure areas that act on the upwardly directed edges of the well bases which have not yet been turned inside out. By lowering the press stamp, the well bases, which can be handled in the original interconnected arrangement even after separation from the rest of the microtitre plate, or their upwardly directed wall portions or suchlike regions, can, by reason of the curvature of the well bases, be turned inside out and/or pressed down on the support provided with nubs. The perforations or suchlike depressions in the press stamp prevent pressure from acting to an excessive extent on the sample arranged on the well bases when the wall portions or the like are pressed down.

A simple and advantageous embodiment according to the invention provides that the support provided with the upwardly directed nubs is in the form of a plate, film or the like and serves to connect the well bases before the bases are detached, and can be fixed, especially adhesively bonded or welded, by its nubs to the undersides of the bases.

Another proposal according to the invention provides that a continuously smooth, flexible film or plate serves to connect the bases of the wells of a microtitre plate, and the support provided with nubs is in the form of a separate counter-stamp for the press stamp.

It may also be advantageous if the connecting film for the well bases is connected thereto by being prefabricated therewith. With such an embodiment the upwardly directed wall regions of the wells, which regions project beyond the connecting film of the microtitre plate, have merely to be detached in order to be able to bring the samples close to the measuring apparatus. The well bases which are connected to one another by means of the connecting film can be handled in their original interconnected arrangement even after the rest of the wall regions of the wells have been detached.

Developments of the invention are indicated in other subsidiary claims. The invention is explained in more detail below with reference to advantageous embodiments and in conjunction with the Figures, in which FIG. 1 shows, in a perspective and partially broken-away view, a microtitre plate which has wells arranged in rows and columns, the bases of these wells being connected to one another by means of a flexible plate, FIG. 2 shows the microtitre plate of FIG. 1 in longitudinal section, FIG. 3 shows the bases of FIGS. 1 and 2, which are connected to one another by the plate, after the rest of the wall portions or wall regions of the wells have been detached, FIG. 4 shows the bases of FIG. 3, which are connected to one another by the plate, between a support, provided with nubs and acting as a counter-stamp, and a press stamp having perforations or depressions, FIG. 5 shows the well bases of FIG. 3 after their upwardly directed wall regions have been pressed down, FIG. 6 shows a microtitre plate the well bases of which are adhesively bonded or welded to the nubs of a plate-shaped support and FIG. 7 shows a longitudinal section through a microtitre plate the well bases of which are connected to one another by means of a connecting film in the transition zone between the base region to be separated and the remaining wall region of the wells, the connecting film for the well bases being connected thereto by being prefabricated therewith.

FIGS. 1 and 2 show a portion of a microtitre plate 1 having a plurality of wells 2 that are connected to one another in rows and columns. Each of the wells 2 has, at an approximately cylindrical wall region 3, a closed, approximately semicircular end region which is in the form of a well base 4. At the opposite end of the wells 2, which has the opening 5, the wells are connected to one another by the approximately plate-shaped upper side 6 of the microtitre plate 1.

As can clearly be seen from the cut-away partial region of the microtitre plate 1 in FIG. 1, each of the wells 2, which have only a comparatively small volume, contains a sample 7 at the base 4 of the well. Contained in each of those samples 7 is solid-bound, for example cell-bound, radioactivity or radioactivity in the form of a protein precipitate.

In order to measure this radioactivity contained in the samples 7, the emitted electron radiation of which has only a very small range, the bases 4 of the wells 2 are adhesively bonded or welded by way of a plate 8 so that they can be separated from the microtitre plate 1 and the corresponding wall region 3 of the wells 2, for example by a hot wire which cuts through the plastics material of the microtitre plate 1, in such a manner that they retain their spacing relative to one another and their original position. Even after separating the well bases 4 in the cutting plane III—III of FIG. 2, these bases can, as shown in FIG. 3, still be handled in their original interconnected arrangement, that is to say, in their former position relative to one another, and even after cutting away the upper portion of the microtitre plate 1, the bases 4 thus remain in their original position relative to one another.

In order, in the case of in situ measurement, to be able to measure the radioactivity of the samples 7 contained in the wells 2 with a sufficient counting yield and spatial resolution and in order to be able to bring the samples as close as possible to the measuring apparatus, for example a location-dependent Berthold proportional counter tube, the well bases 4, which are connected to one another by means of the plate 8 but have been separated from the rest of the microtitre plate 1, are arranged on the support 9 of an apparatus 10 constructed as a press (see FIG. 4). The support 9 is provided with upwardly directed nubs 11 which are arranged with the same grid spacing as the wells of the microtitre plate 1 and their well bases 4. The well bases 4 with their plate 8 are arranged on the support 9 in such a manner that each well base 4 rests on an associated nub 11 of the support 9.

The support 9 serves as a counter-stamp for a press stamp 12 of the apparatus 10, which press stamp has, in the region of the nubs 11 of the support 9, perforations 13 or suchlike depressions and, arranged alongside them, pressure areas 14 that act on the upwardly directed wall regions of the approximately hemispherical well bases 4 which, in FIG. 4, have not yet been turned inside out. By lowering the press stamp 12 of the apparatus 10, the wall regions 15 which are directed upwards by reason of the curvature of the well bases 4 (see FIG. 4) can be pressed down and turned inside out with the aid of the nubs 11 of the support 9. The perforations 13 in the press stamp 12 prevent the unnecessary pressing-together and compression of the samples 7 carried by the well bases 4.

As shown in FIG. 5, each of the radioactive samples 7 thus becomes practically freely accessible so that the measuring apparatus can be brought to within touching distance of the samples, which, in view of the very small range of the electron radiation emitted, results in a high degree of sensitivity and spatial resolution. Maximum distances of, for example, 3 mm can be achieved.

In order to prevent contamination of the press stamp 12 and of the apparatus 10, or if the radioactive source 7 does not adhere sufficiently to the respective well base 4, the cut well bases 4 can be covered with a thin film of, for example, stretched polyethylene before the pressing operation in the apparatus 10, and the covered samples contained therein can be measured in succession, in groups or simultaneously over the entire grid of the microtitre plate 1. The samples carried by the bases 4 of the wells 2 can be measured in lines, especially in rows or columns, since, of course, the original spacing and the former position of the bases 4 are maintained with the aid of the plate 8.

It may be advantageous if the upwardly directed wall portions 15 of the well bases 4 are heated until deformation occurs and are pressed down; for that purpose, the press stamp 12 is advantageously provided with a heating device (not shown here).

FIG. 6 shows a longitudinal section through a microtitre plate 50 in which the support 9' provided with the upwardly directed nubs is in the form of a plate, film or the like which at the same time serves to connect the well bases 4 when they have been separated from the microtitre plate 50 and to that end can be fixed, especially adhesively bonded or welded, by its nubs 11 to the undersides of the well bases 4. During the operation of pressing and turning inside out, the nubs 11 of the support 9' serve as press moulds in order to be able to expose the samples contained in the well bases 4. The nubs 11 on the support 9' are in the form of approximately lenticular thickened portions. The microtitre plate 50 adhesively bonded, welded or connected in some other manner to the support 9, has a relatively high degree of rigidity and therefore can be handled by a robot without additional aids.

When the microtitre plate 50 shown in FIG. 6 is used it is unnecessary to have a further support, likewise having nubs, on the pressing apparatus and, instead, the press stamp in the form shown in FIG. 4 can cooperate with an even, flat counter-stamp.

FIG. 7 shows a longitudinal section through a microtitre plate 100 the wells 2 of which are not connected to one another in the region of their openings 5 but rather are connected to one another by means of a connecting film 16 at the transition zone between the well bases 4 to be detached and the remaining wall regions 3 of the wells 2.

This connecting film 16, which is already connected to the well bases 4 by being prefabricated therewith, is arranged below the plane of separation VII—VII so that, even after detaching the rest of the wall regions 3, the well bases 4 are connected to one another with their former spacing and in the original position.

After separation, the interconnected well bases 4 of the microtitre plate 100 can also be turned inside out in order to be able to bring the measuring apparatus to within touching distance of the samples (not shown here) carried by the bases.

It is advantageous if the projecting length of the upwardly directed nubs of the counter-stamp of the press, which counter-stamp is in a form similar to that in FIG. 4, corresponds to the length to which the initially concave bases 4 project below the connecting film 16, so that the bases 4 can be turned inside out as satisfactorily and as completely as possible.

A method and an apparatus for measuring the radioactivity of samples that are arranged in the wells of a microtitre plate and in which the radioactivity is solid-bound, for example cell-bound, or is in the form of a protein precipitate, wherein samples suspended, dissolved or mixed in liquids are first separated from the liquids and then their liquid supernatant is removed by suction, comprises connecting the bases 4 of the wells of the microtitre plate to one another and then separating them from the microtitre plate or the well walls in such a manner that they remain connected, and subsequently measuring the samples they carry in succession, in groups or simultaneously over the entire grid. Thus, the well bases 4 can be handled and prepared for the measurement of radioactivity in their original position and arrangement even after separation from the rest of the microtitre plate, it also being possible to bring the bases 4, which have been separated from the microtitre plate, and the samples arranged thereon close to, and within touching distance of, the measuring apparatus. As a result it is possible to achieve a high degree of sensitivity and spatial resolution even in the case of samples of which the emitted electron radiation has only a very small range.

By connecting the well bases before they are separated from the rest of the microtitre plate, their original position relative to one another can be maintained; as a result, the organisation of the many samples in the pressing and measuring operations becomes considerably simpler and, in addition, it is impossible inadvertently to interchange the samples of individual well bases when the radioactivity is being measured.

What is claimed is:

1. A method for measuring the radioactivity of samples that are arranged in the wells of a microtitre plate and in which the radioactivity is solid-bound, or is in the form of a protein precipitate, wherein samples suspended, dissolved or mixed in liquids are first separated from the liquids and then their liquid supernatant is removed by suction, which method comprises connecting the bases (4) of the wells (2) of the microtitre plate (1, 50, 100) to one another to form a grid, then separating the bases from the microtitre plate or the well walls in such a manner that they remain connected, deforming the interconnected well bases in such a manner that wall portions (15) arranged thereon and remaining after said separation are turned inside out, and subsequently measuring the samples (7) they carry in succession, in groups or simultaneously over the entire grid.

2. A method according to claim 1, which comprises heating the wall portions (15) of the well bases (4) until deformation occurs.

3. A method according to claim 2, with a microtitre plate the wells of which are arranged in rows or columns with respect to one another, which comprises measuring the samples (7) carried by the bases (4) of the wells (2) in rows or columns.

4. A method according to claim 1, which comprises covering the openings of the interconnected well bases (4), which have been separated from the rest of the microtitre plate (1, 50, 100), with a film of stretched polyethylene, before the turning and measuring operations.

5. An apparatus for measuring the radioactivity of samples that are arranged in the well bases of the wells of a microtitre plate and in which the radioactivity is solid-bound, or is in the form of a protein precipitate, wherein samples suspended, dissolved or mixed in liquids are first separated from the liquids and then their liquid supernatant is removed by suction, which apparatus comprises a support (9, 9') for the well bases (4) which is provided with protruding nubs (11) arranged with the same spacing as the wells (2) of said microtitre plate (1, 50, 100) and their well bases (4), a press stamp (12) which has depressions in the region of the nubs (11) of the support (9, 9'), and, positioned adjacent to said depressions, means for acting on and inverting the well bases.

6. An apparatus according to claim 5, wherein the support (9') provided with the protruding nubs (11) is in the form of a plate or film and serves to connect the well bases (4) before the bases (4) are detached.

7. An apparatus according to claim 6, in which the connecting film or plate (16, 8) is fused onto the underside of the well bases (4).

8. An apparatus according to claim 6, wherein the protruding nubs of the connecting film or plate are adhesively bonded or welded to the underside of the well bases.

9. An apparatus according to claim 5, wherein a continuously smooth, flexible film (16) or plate (8) serves to connect the bases (4) of the wells (2) of the microtitre plate (1, 50, 100), and the support (9) provided with nubs (11) is in the form of a separate counter-stamp for the press stamp (12).

10. An apparatus according to claim 9, wherein the connecting film (16) or plate (8) for the well bases (4) is arranged at the transition zone between the base region to be separated and the remaining wall region of the wells (2), on the side towards the base and below the separation position, and the length to which the initially concave bases project below that connecting film corresponds approximately to the projecting length of the protruding nubs (11) of the counter-stamp of the press.

11. An apparatus according to claim 10, in which the connecting film or plate (16, 8) for the well bases (4) is connected thereto by being prefabricated therewith.

12. An apparatus according to claim 5, in which the openings of the interconnected well bases (4), which have been separated from the rest of the microtitre plate (1, 50, 100), are covered with a film of stretched polyethylene before the inverting operation or during the measuring operation.

* * * * *